April 14, 1953 R. D. HANCOCK 2,635,195

GRAPH SENSING DEVICE

Filed March 12, 1951 2 SHEETS--SHEET 1

INVENTOR:
Robert D. Hancock

By Herbert E. Metcalf
HIS PATENT ATTORNEY

April 14, 1953 R. D. HANCOCK 2,635,195

GRAPH SENSING DEVICE

Filed March 12, 1951 2 SHEETS—SHEET 2

INVENTOR:
Robert D. Hancock

By Herbert E. Metcalf
HIS PATENT ATTORNEY

Patented Apr. 14, 1953

2,635,195

UNITED STATES PATENT OFFICE 2,635,195

GRAPH SENSING DEVICE

Robert D. Hancock, Compton, Calif., assignor to Northrop Aircraft, Inc., Hawthorne, Calif., a corporation of California Application March 12, 1951, Serial No. 215,165

12 Claims. (Cl. 250—219)

The present invention relates to function generators, and, more particularly, to optical means for generating a function in terms of pulses.

Among the objects of the invention are:

To provide a means for generating a function in terms of pulses.

To provide a function generator suitable for operating a computer.

To provide an optical means for generating a function in terms of pulses.

To provide a function generating system in which the function to be generated can readily be changed.

To provide a simple and accurate function generator.

In brief, the present invention in one form includes means for rotating a cylindrical graph having adjoining main areas of different signal producing character, one of the junctions between said main areas being shaped with respect to a base line as the relationship between an independent and a dependent variable. One of said main areas is also provided with longitudinal signal producing lines equally spaced thereon. Sensing device responsive to the character of the signal producing areas is moved along the cylinder as the cylinder is rotated. The main area with the lines thereon produces a series of pulses representing the distance between the junction of said main areas and the base line. These pulses can then be used as a representation of the relation of the dependent to the independent variable.

The invention can be more fully understood by reference to the ensuing description of the attached drawings in which.

Figure 1:
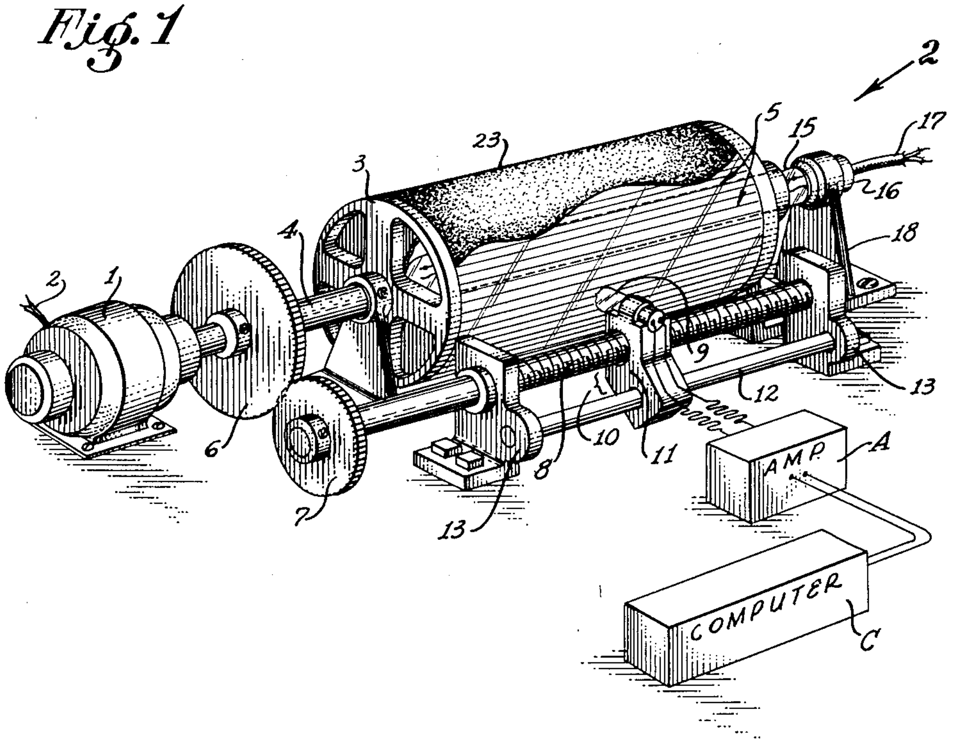
Figure 1 is a perspective view looking toward one end of one form of function generator embodying the present invention.

Referring first to Figure 1, a motor 1, connected to a power source by means of motor leads 2, is connected to a cylinder 3 by means of shaft 4. The cylinder 3 is fashioned from a transparent or translucent material, glass for example, and has a plurality of opaque lines 5 affixed on the external surface orientated so that they are parallel to the axis of rotation of the cylinder 3. A drive gear 6 rigidly attached to shaft 4, and a driven gear 7, which is rigidly attached to a lead screw 8, mesh to transmit rotary motion from motor 1 to lead screw 8. A photocell 9 is rigidly attached to a traveling unit 10 having a support collar 11. The support collar 11 is slidably mounted on a guide bar 12, which is supported by guide bar and lead screw supports 13.

Figure 2:
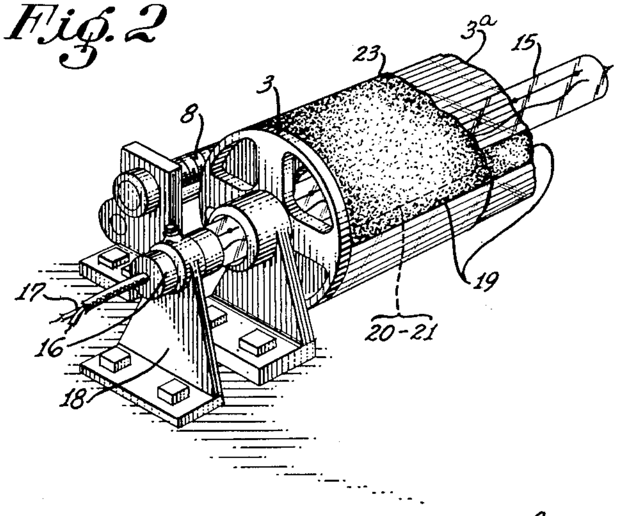
Figure 2 is a fragmentary perspective view of the other end of the device of Figure 1, viewed as indicated by the arrow 2 in Figure 1.

The interior of drum 3 is illuminated by means of lamp 15, as best shown in Figure 2. Lamp socket 16 and lamp leads 17 provide a support and an electrical connection to the lamp 15. Lamp support 18 maintains the position of lamp socket 16, hence lamp 15, such that the interior of cylinder 3 is substantially uniformly illuminated.

In addition to the fine opaque lines 5, one wider opaque line 19 is placed on or in the circumference of the cylinder, having its edges parallel to the lines 5 and hence to the axis of rotation of the cylinder (see Figures 2, 4, 5 and 6). One edge of line 19 will form the base line for the graph.

Figure 3:
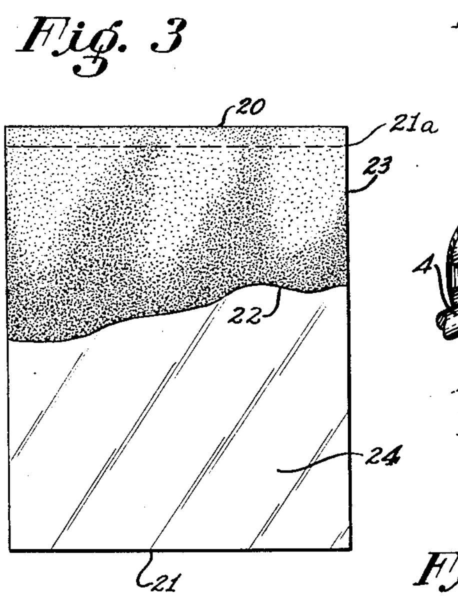
Figure 3 is a graph in planar coordinates of a function, suitable for use in conjunction with the machine of Figures 1 and 2.

A graph to be employed in the present invention can be formed in accordance with Figure 3. Referring to Figure 3, values of an independent variable are made to be proportional to distances measured from right to left, along base line 20 or 21. Corresponding to each independent variable is a value for a dependent variable which is laid off as a distance normal to base lines 20 and 21. The curve 22 is the result of plotting the dependent variable values for all independent variable values.

A preferred form of graph, shown in Figures 1 and 3 consists of a transparent or translucent portion 24 and an opaque or reduced transmission portion 23 with the dividing line 22 being the plot of dependent variable values. Such a graph may be fashioned from a clear sheet of plastic material, for example, by painting, or otherwise filling in the opaque section 23.

This graph is then wrapped around the outside or inserted inside of the cylinder 3, as shown in Figure 1, so that the base lines 20 and 21 lie within and are masked by the wide opaque line 19 and are parallel to the axis of rotation of cylinder 3. Dotted line 21a in Figure 3 indicates where one edge of opaque line 19 will be when the graph is mounted. This line 21a then can be used as a base line from which measurements are made to create graph 22.

In operation, the motor 1 is energized by applying a proper voltage across motor leads 2. Rotation of the rotor of motor 1 causes rotation of shaft 4, drive gear 6, cylinder 3, driven gear 7, and lead screw 8. A cooperative action between traveling unit 10 and lead screw 8 causes a translation motion, parallel to the axis of rotation of cylinder 3, of the photocell 9, traveling unit 10, and the support collar 11. Guide bar supports 13 maintain the guide bar 12 is a desired position with respect to the cylinder 3; guide bar 12, in a co-action with support collar 11, prevents rotation of photocell 9.

As the cylinder 3 rotates, the photocell 9 advances so that one revolution of the cylinder causes the photocell to move a distance equal to one increment of the dependent variable as plotted. For a part of each revolution of the cylinder 3 light will be transmitted from the lamp 15, through the cylinder and the graph to the photocell. However, this light transmission will not be continuous since the opaque lines 5 will interrupt the light beam to the photocell, thereby causing a pulsed or modulated voltage output in photocell lead 14.

When a single value of the independent variable is considered, it is evident that the number of pulses in the photocell lead 14, during a revolution of cylinder 3, when photocell 9 is in a position corresponding to this value of the independent variable, is proportional to the value of the dependent variable. In effect the sum of the pulse outputs on photocell lead 14 during one revolution of cylinder 3 is a measure of the distance from the edge of wide opaque line 19 to the curve 22 and is, therefore, a reversal of the operation performed during the construction of the graph.

A variation in the number of independent variable values available can be achieved by altering the gear teeth ratio between drive gear 6 and driven gear 7 or by altering the pitch of lead screw 8.

The pulses in photocell lead 14 can be applied to a computer C as shown in Figure 1, through amplifier A, and may be applied to relays controlling the power input to a motor, or the like.

Figures 4, 5:
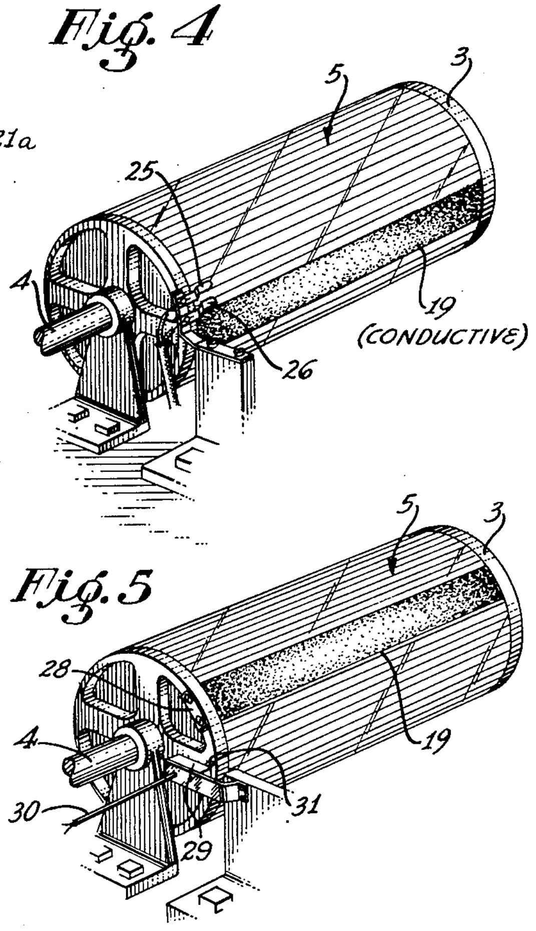
Figure 4 is a fragmentary perspective view of an increment counting device as applied to the device of Figures 1 and 2.
Figure 5 is a fragmentary perspective view of a modified type of increment counting device.

The invention, however, is also adapted to detect changes in the independent variable as well as to measure the value of the dependent variable. Referring next to Figure 4, a portion of the wide opaque line 19, for example, can be made conductive. Two contacts 25 and 26 are then positioned so that they intercept this conductive portion once every revolution and thereby cause a short circuit between contacts 25 and 26 and detect a unit change of the independent variable value.

A switch 29, of Figure 5, performs a similar operation, in detecting a change in value of the independent variable, to the contacts 25 and 26. An actuating cam 28 is attached to the cylinder 3 in such a position that it actuates the switch 29 once every revolution of the cylinder. This is accomplished by causing a follower 31 of switch 29 to bear against cylinder 3 and lie in a path on the cylinder that includes cam 28. When cam 28 passes under follower 31, switch 29 either opens or closes a circuit containing switch leads 30, thereby indicating a unit change in the independent variable.

Figure 6:
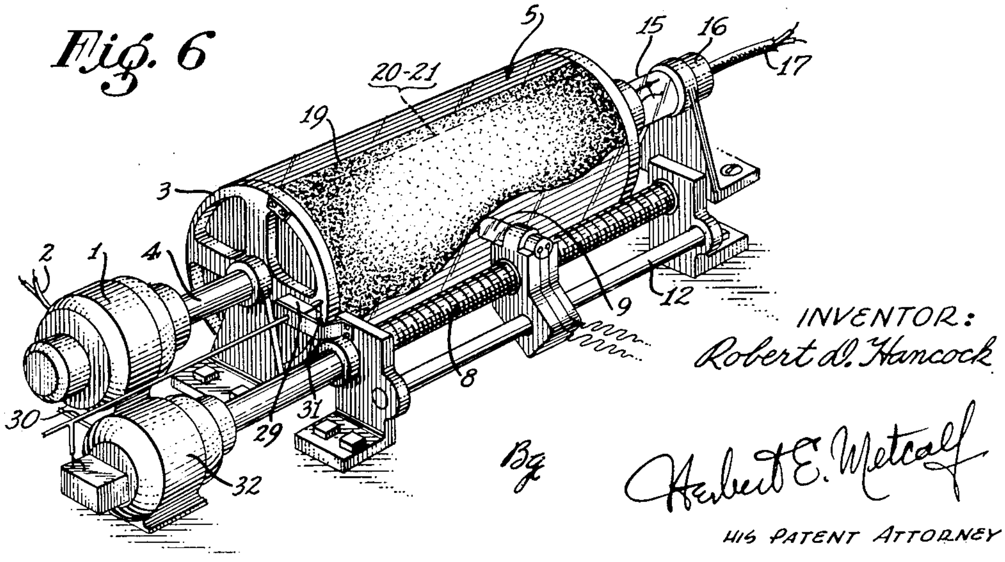
Figure 6 is a perspective view of an increment counting device as connected to apply longitudinal increments to the pulse pickup of the device of Figures 1 and 2.

The pulses in switch leads 30 can be used to control the power input to a pulse motor. As shown in Figure 6, switch leads 30 are connected to a pulse motor 32 which drives the lead screw 8. Once every revolution of the cylinders 3, switch 29 will be actuated to energize switch leads 30, thereby causing pulse motor 32 to rotate through a specified amount of rotation. Rotation of pulse motor 32 results in rotation of lead screw 8 and in translation of photocell 9. This method of controlling the motor of photocell 9 affords an advantage in that the distance, corresponding to a value of the dependent variable, is measured along a line normal to the base lines 20 and 21, just as it was when the graph was laid out.

If desired, the output from contact leads 27 or from switch leads 30 can be applied to a computer, for example, to supplement the input to the computer coming from photocell lead 14.

While I have described my invention as using a photocell pickup, this being a convenient, accurate and preferred signal sensing device, I desire it to be distinctly understood that other types of signal producing areas may be mounted on cylinder 3 with signal producing lines of the same type and a pickup used that will sense the particular type of signal producing areas used. Thus, area 3a, lines 5 and 19, can be conductive and electrically connected, the pickup then being a wiper contact. Or, for example, the area 3a, lines 5 and 19, may be recorded on magnetic material with a magnetic pickup utilized.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred forms of putting the invention into effect, and the invention is, therefore, claimed in any of its forms or modifications within the legimitate and valid scope of the appended claims.

What is claimed is:

1. A function generator comprising a cylinder having a plurality of equally spaced signal producing lines on the periphery thereof, said lines being parallel and parallel to the axis of said cylinder, means for rotating said cylinder on its axis, one of said lines being substantially and uniformly wider than the remainder of said lines, signal pickup means adjacent the periphery of said cylinder responsive to movement of said lines to produce a pulse for each line, and driving means for moving said pickup means along a path parallel to the axis of the rotating cylinder at a speed proportional to the rotation of said cylinder, whereby a long pulse spaced by a plurality of shorter pulses will be produced by said signal pickup for each revolution of said cylinder.

2. Apparatus in accordance with claim 1 wherein means are provided to cover a substantial area along said cylinder including said lines to divide said cylinder into a signal producing area and a signal preventing area.

3. Apparatus in accordance with claim 1 wherein means are provided to cover a substantial area along said cylinder including said lines to divide said cylinder into a signal producing area and a signal preventing area, and wherein the junction of said areas is a line representing a graph of a function as measured from one edge of said wider line at right angles thereto.

4. Apparatus in accordance with claim 1 wherein means are provided to cover a substantial area along said cylinder including said lines to divide said cylinder into a signal producing area and a signal preventing area, and wherein the junction of said areas is a line representing a graph of a function as measured from one edge of said wider line at right angles thereto, said graph representing the relationship between an independent and a dependent variable.

5. Apparatus in accordance with claim 1 wherein means are provided to produce a pulse representing each revolution of said cylinder, and wherein said driving means is a motor driven by said revolution pulse.

6. Apparatus in accordance with claim 1 wherein a mask is provided to be mounted on said cylinder, said mask having a portion preventing said pickup from responding to said lines.

7. Apparatus in accordance with claim 1 wherein a mask is provided to be mounted on said cylinder, said mask having a portion preventing said pickup from responding to said lines, one edge of said portion being shaped to represent the relationship between an independent and a dependent variable whereby the pulse output of said pickup represents said relationship in terms of pulses.

8. A function generator comprising a cylinder of light transmitting material, means for rotating said cylinder, said cylinder having a plurality of equally spaced parallel light obstructing lines thereon extending parallel to the axis of said cylinder, a light source inside of said cylinder, a light responsive pickup outside of said cylinder, and means for progressing said pickup along said cylinder over a path parallel to the axis of said cylinder at a speed proportional to the rotation of said cylinder.

9. A function generator comprising a cylinder of light transmitting material, means for rotating said cylinder, said cylinder having a plurality of equally spaced parallel light obstructing lines thereon extending parallel to the axis of said cylinder, a light source inside of said cylinder, a light responsive pickup outside of said cylinder, and means for progressing said pickup along said cylinder over a path parallel to the axis of said cylinder at a speed proportional to the rotation of said cylinder, one of said lines being wider than the remainder to produce a special pulse once every revolution of said cylinder.

10. A function generator comprising a cylinder of light transmitting material, means for rotating said cylinder, said cylinder having a plurality of equally spaced parallel light obstructing lines thereon extending parallel to the axis of said cylinder, a light source inside of said cylinder, a light responsive pickup outside of said cylinder, and means for progressing said pickup along said cylinder over a path parallel to the axis of said cylinder at a speed proportional to the rotation of said cylinder, one of said lines being wider than the remainder to produce a special pulse once every revolution of said cylinder, and a mask mounted on said cylinder, said mask having a light transmitting portion and a light obstructing portion covering specific portions of the lines on said cylinder whereby the number of pulses produced by said pickup will differ from the number produced by the unmasked cylinder.

11. A function generator comprising a cylinder of light transmitting material, means for rotating said cylinder, said cylinder having a plurality of equally spaced parallel light obstructing lines thereon extending parallel to the axis of said cylinder, a light source inside of said cylinder, a light responsive pickup outside of said cylinder, and means for progressing said pickup along said cylinder over a path parallel to the axis of said cylinder at a speed proportional to the rotation of said cylinder, one of said lines being wider than the remainder to produce a special pulse once every revolution of said cylinder, and a mask mounted on said cylinder, said mask having a light transmitting portion and a light obstructing portion covering specific portions of the lines on said cylinder whereby the number of pulses produced by said pickup will differ from the number produced by the unmasked cylinder, the junction between said light transmitting area and said light obstructing area being formed into a curve extending along said cylinder and representing the relation of an independent to a dependent variable.

12. Apparatus in accordance with claim 10 wherein said mask is rectangular and mounted on said cylinder with two edges thereof within the edges of said wider line.

ROBERT D. HANCOCK.

References Cited in the file of this patent

UNITED STATES PATENTS

| Number | Name | Date |
|---|---|---|
| 2,086,798 | Greenberg | July 13, 1937 |
| 2,179,000 | Tea | Nov. 7, 1939 |
| 2,360,883 | Metcalf | Oct. 24, 1944 |